D. GUPTAIL.
Machines for Removing Green Corn from the Cob.
No. 148,363. Patented March 10, 1874.
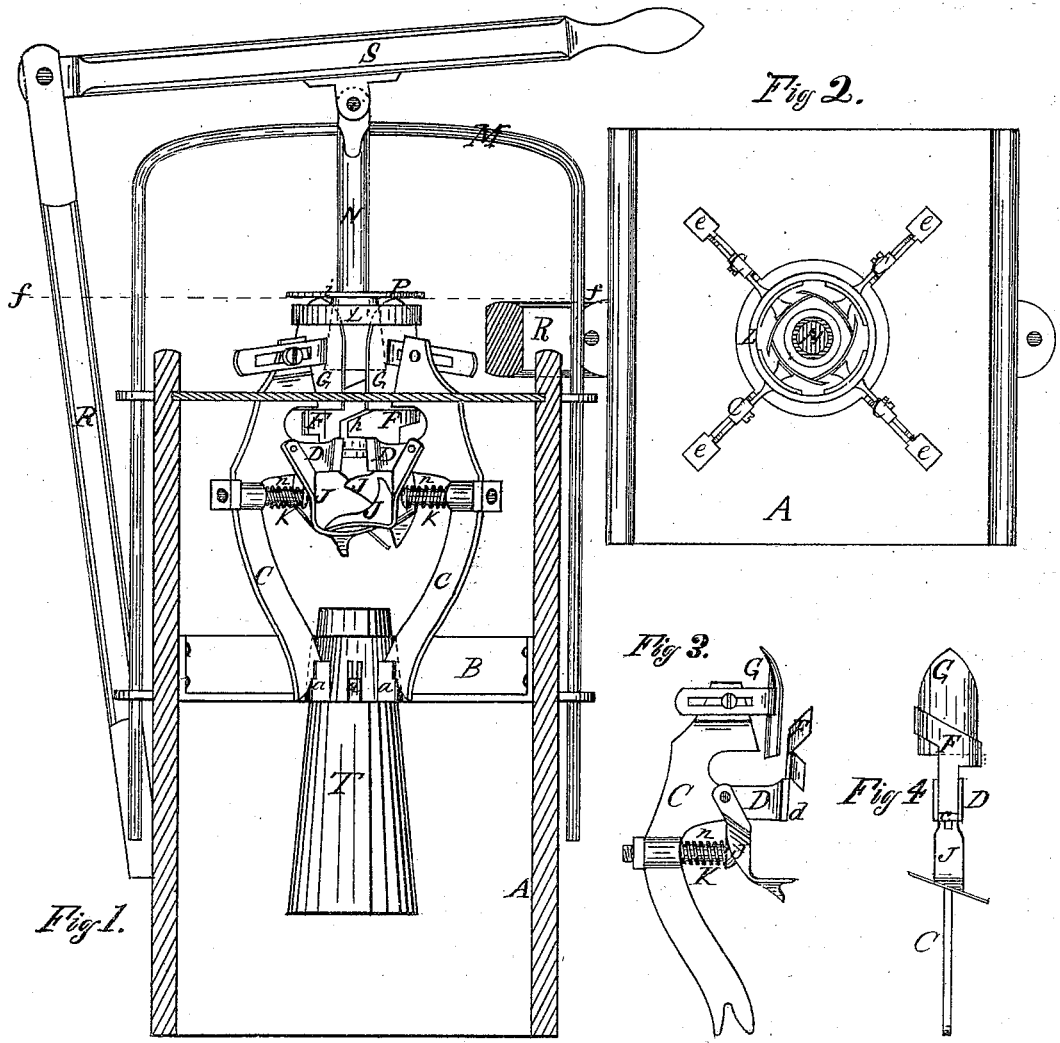
Witnesses
N. H. Sherburne
William Edgar
Inventor
Dan Guptail
By Sherburne & Co.,
His Attorneys

UNITED STATES PATENT OFFICE.

DAN GUPTAIL, OF ELGIN, ILLINOIS, ASSIGNOR OF ONE-HALF HIS RIGHT TO F. L. McCLURE, OF SAME PLACE.

IMPROVEMENT IN MACHINES FOR REMOVING GREEN CORN FROM THE COB.

Specification forming part of Letters Patent No. 148,363, dated March 10, 1874; application filed November 8, 1873.

*To all whom it may concern:*

Be it known that I, DAN GUPTAIL, of Elgin, in the county of Kane and State of Illinois, have invented a new and useful Improvement in Machines for Removing Green Corn from the Cob; and I do hereby declare the following to be a full, clear, and exact description thereof, which will enable others skilled in the art to which my invention appertains to make and use the same, reference being had to the accompanying drawing forming part of this specification, in which—

Figure 1 is a front elevation of my said invention with the front walls of the case removed, showing the operating parts of the machine. Fig. 2 is a general plan of the machine, taken on the line $ff$, drawn across Fig. 1. Fig. 3 is a side elevation of the cutter-arm detached, showing the parts employed in removing the corn; Fig. 4 is a front or edge view of the same.

Similar letters of reference indicate like parts in the several figures of the drawing.

My invention has for its object to provide a machine for removing green corn from the cob; and to that end it consists in the combination of a system of cutters and scrapers so arranged as to adapt themselves to the size and shape of a cob, whereby the kernels are removed and the cob properly scraped at one and the same operation, all of which will be more fully understood by the following description.

In the drawing, A represents the frame or case, which is substantially made of wood or metal, and in the form shown, or may be made in any suitable form that will receive the operating parts of the machine. Firmly secured to the inner side of the case, at a point near its center vertically, is a girt, B, which extends transversely across the same. Affixed to the center of this girt is a system of lugs, $a$, within which is loosely stepped a system of vertical arms, C. These arms extend upward through radial slots $e$, formed through the upper portion or cap of the case, and which are so arranged as to admit of a free and easy oscillating movement of the arms. These arms are curved outward at the center, as shown in Figs. 1 and 3, and are each provided with lugs D, which extend inward toward the center of the machine. The inner end of each lug is inclined outward at the lower edge, as shown at $d$, and is provided with a vertical groove or channel, $e$, formed in its end, within which the shank of the cutters F are secured. These cutters extend upward above the lugs, and are curved at the upper edge, approximating the circumference of the cob, and are also so sloped as to allow the upper edge of the alternate side of each cutter to pass under the lower edge of the adjacent cutter, as shown at $h$, Fig. 1, the object being to allow the respective cutters to be moved toward or from the center, whereby the same are adjusted to the size of the cob without coming in contact one with the other. Affixed to the upper end of each arm is a gage, G, which is so arranged as to admit of being moved thereon toward or from the center of the machine, and rigidly secured at any adjusted point. The bearing-surface of each gage is curved, approximating the periphery or outer surface of the ear, and is so arranged as to come in contact therewith, by which means the cutters are adjusted to the proper depth of cut by moving the gage upon the arm toward or from the center of the machine. Pivoted to lug D of each of the arms is a scraper, J, which is so arranged as to admit of a free and easy oscillating movement upon its fulcrum. The lower end of each scraper is bent inward toward the center of the machine, and its edge is curved approximating the circumference of the cob, and is so arranged as to allow the edge of each to pass under the alternate edge of the adjacent scraper, by which the same may be moved toward or from the center of the machine without coming in contact one with the other. Loosely secured within each of the arms, at a point near the center, is a pivot, K, which is so arranged as to bear against the back of the scraper. These pivots are so fitted in their bearings as to admit of a free and easy longitudinal movement. Loosely mounted upon each pivot is a spiral spring, $n$, one end of which bears against the inner surface of the arm, and the opposite end against a shoulder formed on the inner end of the pivot, as shown at Fig. 3. The arrangement of these pivots and springs is such as to compress their respective scrapers against the cob jointly with and independent of the movement of the arms. Loosely fitted around the upper extremity of the several gages is an elastic band, L. This band is such that by its elasticity the gages are firmly held against the surface of the ear; consequently, the respective cutters are brought to the proper position to cut the kernels from the cob, as the respective scrapers are forced against the cob by the action of springs $n$, thereby enabling each part to perform its function without reference to the size of the ear or diameter of the cob. Affixed to the outer sides of the case are guides, within which is loosely fitted a metal frame, M. This frame is so arranged as to admit of a positive ascending or descending movement. Attached to the center of this frame is a plunger, N, which is so arranged as to pass between the gages G as the frame is moved downward. Upon this plunger is loosely fitted a follower, P. This follower is provided at its lower end with a socket adapted to receive the butt of the ear, and at its upper end with a flange, $i$, which comes in contact with the upper end of the gages, as the same is moved downward by the plunger. Attached to the side of the case is a vertical upright, R, to which is pivoted a lever, S. This lever is pivoted at or near its center to the upper end of the plunger, as shown in Fig. 1. Thus, as a tilting movement is communicated to the lever the requisite ascending or descending movement is imparted to the plunger. Affixed within the center of girt B, and immediately under the scrapers, is a funnel-shaped tube, T, through which the cob passes after the same has passed between the scrapers.

It will be observed that the cutters are slightly inclined outward at their lower ends, the object of which is to prevent the shank and lower portions of the blade from coming in contact with the cob.

The operation of my invention is as follows: Lever S is raised upward, and consequently the plunger and follower. The ear is then placed between the gages, allowing the butt to enter the socket in the follower. The lever is then moved downward, which forces the ear between the cutters by the action of the plunger, bringing their cutting-edges in contact with the kernels, and by a continuous downward movement of the lever the ear is forced downward, bringing the cob between the scrapers, and by the combined action of the cutters and scrapers the corn is wholly removed from the cob, which passes downward through tube T, thereby separating it from the corn, the follower, acting to prevent the cob from being split by the pressure of the plunger, and the elastic band acting to hold the gages firmly against the ear.

Having thus described my invention, I claim—

1. In combination, with the oscillating arms C, adjustable gages G, and elastic band L, the circular cutters F, all operating together substantially as and for the purpose specified.

2. In combination, with the oscillating arms C, the adjustable scrapers J, arranged to operate as specified.

3. The combination of the scrapers J, oscillating arms C, cutters F, lever S, plunger N, and follower P, all operating together, as and for the purpose specified.

The above specification of my invention signed by me this 15th day of October A. D. 1873.

DAN GUPTAIL.

Witnesses:
 WILLIAM EDGAR,
 N. H. SHERBURNE.